United States Patent
McCarty

(10) Patent No.: US 6,609,481 B1
(45) Date of Patent: Aug. 26, 2003

(54) GAME ANIMAL LIFT ASSEMBLY FOR ALL TERRAIN VEHICLES

(76) Inventor: Lane McCarty, P.O. Box 311, Woodville, MS (US) 39669

( * ) Notice: Subject to any disclaimer, the term of this patent is extended or adjusted under 35 U.S.C. 154(b) by 0 days.

(21) Appl. No.: 10/261,737

(22) Filed: Sep. 30, 2002

(51) Int. Cl.$^7$ .............................. A01K 29/00; B60P 9/00
(52) U.S. Cl. ...................... 119/843; 119/512; 452/187; 414/462; 414/540
(58) Field of Search ................................. 119/843, 453, 119/496, 512, 519, 751, 847, 848; 452/187, 189, 190, 191, 192, 53, 54, 178, 183; 414/137.1, 403, 426, 469, 470, 471, 462, 540, 541, 542

(56) References Cited

U.S. PATENT DOCUMENTS

| | | | | |
|---|---|---|---|---|
| 5,328,192 A | * | 7/1994 | Thompson | 280/47.24 |
| 5,492,196 A | * | 2/1996 | Michno | 182/20 |
| 5,529,453 A | * | 6/1996 | La Gois et al. | 414/462 |
| 5,618,150 A | * | 4/1997 | Poindexter | 414/477 |
| 5,791,858 A | * | 8/1998 | Sasser | 414/462 |
| 5,820,455 A | * | 10/1998 | Breedlove | 452/187 |
| 5,964,565 A | * | 10/1999 | Skotzky | 414/462 |
| 6,045,442 A | * | 4/2000 | Bounds | 452/187 |
| 6,089,431 A | * | 7/2000 | Heyworth | 224/521 |
| 6,109,855 A | * | 8/2000 | Vela-Cuellar | 414/462 |
| 6,202,868 B1 | * | 3/2001 | Murray | 212/294 |
| 6,435,801 B2 | * | 8/2002 | Talbott | 414/462 |
| 6,461,095 B1 | * | 10/2002 | Puska | 414/462 |
| 6,496,123 B2 | * | 12/2002 | Brinkman | 340/908 |

* cited by examiner

Primary Examiner—Yvonne Abbott
(74) Attorney, Agent, or Firm—Joseph N. Breaux

(57) ABSTRACT

A game animal lift assembly for all terrain vehicles (ATVs) that is used to lift the carcass of a dead game animal from the ground up onto the carrying rack of an ATV. The game animal lift assembly includes a winch assembly having a flexible winch tether, a receiver hitch connecting assembly, a lifting mechanism horizontal support rod, two height adjustable vertical ground support bar assemblies, an adjustable length chassis support bar assembly, and a pivoting game animal lifting mechanism pivotally attached to the lifting mechanism horizontal support rod.

1 Claim, 3 Drawing Sheets

GAME ANIMAL LIFT ASSEMBLY FOR ALL TERRAIN VEHICLES

TECHNICAL FIELD

The present invention relates to accessories for all terrain vehicles (ATVs) and more particularly to a game animal lift assembly for all terrain vehicles having an ATV chassis including a frame structure carried on a wheeled undercarriage, a receiver hitch receiver assembly attached to the wheeled undercarriage, and a carrying rack supported by the ATV chassis; the game animal lift assembly for all terrain vehicles including a winch assembly having a flexible winch tether, a receiver hitch connecting assembly, a lifting mechanism horizontal support rod, two height adjustable vertical ground support bar assemblies, an adjustable length chassis support bar assembly, and a pivoting game animal lifting mechanism pivotally attached to the lifting mechanism horizontal support rod; the receiver hitch connecting assembly including a receiver insert tube adapted to rigidly connect with the receiver hitch receiver assembly of the ATV; the adjustable length chassis support bar assembly having a bottom chassis support bar end pivotally supported by the receiver insert tube and an ATV chassis support end having a channel structure connected thereto that is sized to support a section of the ATV frame structure of the ATV chassis in a manner to prevent movement of the ATV frame structure toward the wheeled undercarriage when the game animal lift assembly for all terrain vehicles is in use; the lifting mechanism horizontal support rod being rigidly supported by the receiver insert tube; each of the two height adjustable vertical ground support bar assemblies being attached to an end of the lifting mechanism horizontal support rod and being adjustable in height in a manner such that the two height adjustable vertical ground support bar assemblies prevent the wheeled undercarriage of the ATV from moving toward the ground supporting the ATV when the game animal lift assembly for all terrain vehicles is in use; the pivoting game animal lifting mechanism including two lift mechanism height adjustment assemblies and an adjustable width game animal support bed including two width adjustment assemblies and two game animal lift blades extending perpendicularly from the adjustable width game animal support bed; the pivoting game animal lifting mechanism further including a winch line attachment ring on a center edge of the adjustable width game animal support bed that is connected to a flexible winch tether of a winch assembly secured to the ATV in a manner such that the flexible winch tether provides a tensional force between the winch line attachment ring and the ATV chassis such that the pivoting game animal lifting mechanism is forced to pivot along the lifting mechanism horizontal support rod causing the adjustable width game animal support bed to move from a perpendicular orientation to the ground to a parallel orientation with the ground; the pivoting game animal lifting mechanism including two securing chain assemblies for securing the pivoting game animal lifting mechanism to the ATV chassis while the adjustable width game animal support bed is in a parallel orientation with the ground.

BACKGROUND ART

The carcass of a dead game animals, such as a deer, can be difficult to manipulate. It can be particularly difficult to lift a deer carcass onto the carrying rack of an ATV. It would be a benefit, therefore, to have a game animal lift assembly for an ATV that could be used to lift the carcass of a dead game animal from the ground up onto the carrying rack. Because the game animal lift assembly would only be needed during hunting season, it would be a benefit to have such a game animal lift that would be readily mounted to the ATV when needed and easily removed form the ATV when not needed.

GENERAL SUMMARY DISCUSSION OF INVENTION

It is thus an object of the invention to provide a game animal lift assembly for all terrain vehicles that includes a game animal lift assembly for all terrain vehicles having an ATV chassis including a frame structure carried on a wheeled undercarriage, a receiver hitch receiver assembly attached to the wheeled undercarriage, and a carrying rack supported by the ATV chassis; the game animal lift assembly for all terrain vehicles including a winch assembly having a flexible winch tether, a receiver hitch connecting assembly, a lifting mechanism horizontal support rod, two height adjustable vertical ground support bar assemblies, an adjustable length chassis support bar assembly, and a pivoting game animal lifting mechanism pivotally attached to the lifting mechanism horizontal support rod; the receiver hitch connecting assembly including a receiver insert tube adapted to rigidly connect with the receiver hitch receiver assembly of the ATV; the adjustable length chassis support bar assembly having a bottom chassis support bar end pivotally supported by the receiver insert tube and an ATV chassis support end having a channel structure connected thereto that is sized to support a section of the ATV frame structure of the ATV chassis in a manner to prevent movement of the ATV frame structure toward the wheeled undercarriage when the game animal lift assembly for all terrain vehicles is in use; the lifting mechanism horizontal support rod being rigidly supported by the receiver insert tube; each of the two height adjustable vertical ground support bar assemblies being attached to an end of the lifting mechanism horizontal support rod and being adjustable in height in a manner such that the two height adjustable vertical ground support bar assemblies prevent the wheeled undercarriage of the ATV from moving toward the ground supporting the ATV when the game animal lift assembly for all terrain vehicles is in use; the pivoting game animal lifting mechanism including two lift mechanism height adjustment assemblies and an adjustable width game animal support bed including two width adjustment assemblies and two game animal lift blades extending perpendicularly from the adjustable width game animal support bed; the pivoting game animal lifting mechanism further including a winch line attachment ring on a center edge of the adjustable width game animal support bed that is connected to a flexible winch tether of a winch assembly secured to the ATV in a manner such that the flexible winch tether provides a tensional force between the winch line attachment ring and the ATV chassis such that the pivoting game animal lifting mechanism is forced to pivot along the lifting mechanism horizontal support rod causing the adjustable width game animal support bed to move from a perpendicular orientation to the ground to a parallel orientation with the ground; the pivoting game animal lifting mechanism including two securing chain assemblies for securing the pivoting game animal lifting mechanism to the ATV chassis while the adjustable width game animal support bed is in a parallel orientation with the ground.

Accordingly, a game animal lift assembly for all terrain vehicles is provided. The game animal lift assembly for all terrain vehicles having an ATV chassis including a frame structure carried on a wheeled undercarriage, a receiver hitch receiver assembly attached to the wheeled undercarriage, and a carrying rack supported by the ATV chassis; the game animal lift assembly for all terrain vehicles including a winch assembly having a flexible winch tether, a receiver hitch connecting assembly, a lifting mechanism horizontal support rod, two height adjustable vertical ground support bar assemblies, an adjustable length chassis support bar assembly, and a pivoting game animal lifting mechanism pivotally attached to the lifting mechanism horizontal support rod; the receiver hitch connecting assembly including a receiver insert tube adapted to rigidly connect with the receiver hitch receiver assembly of the ATV; the adjustable length chassis support bar assembly having a bottom chassis support bar end pivotally supported by the receiver insert tube and an ATV chassis support end having a channel structure connected thereto that is sized to support a section of the ATV frame structure of the ATV chassis in a manner to prevent movement of the ATV frame structure toward the wheeled undercarriage when the game animal lift assembly for all terrain vehicles is in use; the lifting mechanism horizontal support rod being rigidly supported by the receiver insert tube; each of the two height adjustable vertical ground support bar assemblies being attached to an end of the lifting mechanism horizontal support rod and being adjustable in height in a manner such that the two height adjustable vertical ground support bar assemblies prevent the wheeled undercarriage of the ATV from moving toward the ground supporting the ATV when the game animal lift assembly for all terrain vehicles is in use; the pivoting game animal lifting mechanism including two lift mechanism height adjustment assemblies and an adjustable width game animal support bed including two width adjustment assemblies and two game animal lift blades extending perpendicularly from the adjustable width game animal support bed; the pivoting game animal lifting mechanism further including a winch line attachment ring on a center edge of adjustable width game animal support bed that is connected to flexible winch tether 30 of winch assembly. Winch assembly is mounted to secured to the ATV in a manner such that the flexible winch tether provides a tensional force between the winch line attachment ring and the ATV chassis such that the pivoting game animal lifting mechanism is forced to pivot along the lifting mechanism horizontal support rod causing the adjustable width game animal support bed to move from a perpendicular orientation to the ground to a parallel orientation with the ground; the pivoting game animal lifting mechanism including two securing chain assemblies for securing the pivoting game animal lifting mechanism to the ATV chassis while the adjustable width game animal support bed is in a parallel orientation with the ground.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

EXEMPLARY MODE FOR CARRYING OUT THE INVENTION

Figure 1:
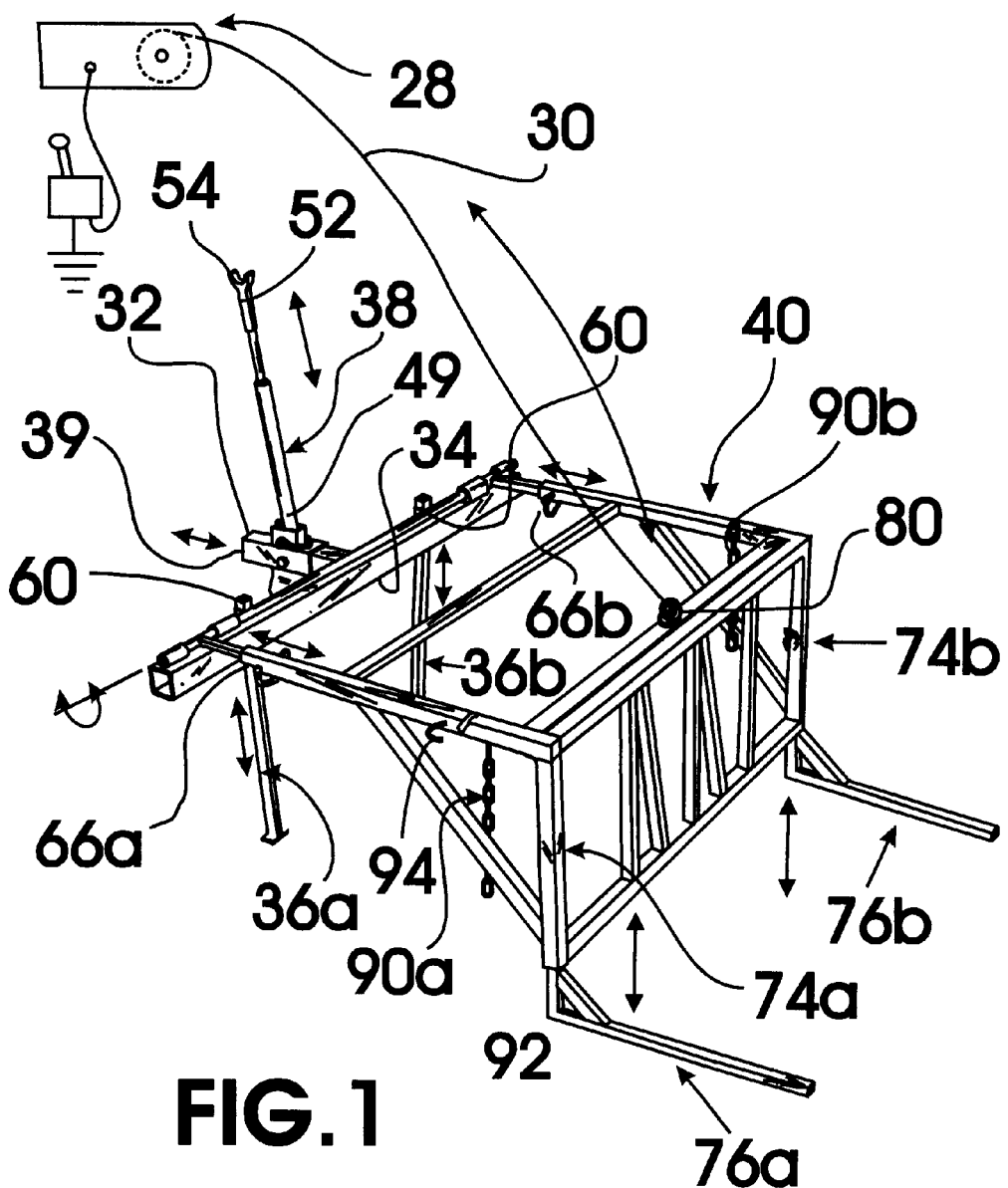
FIG. 1 is a perspective view of an exemplary embodiment of the game animal lift assembly for all terrain vehicles of the present invention.
Figure 2:
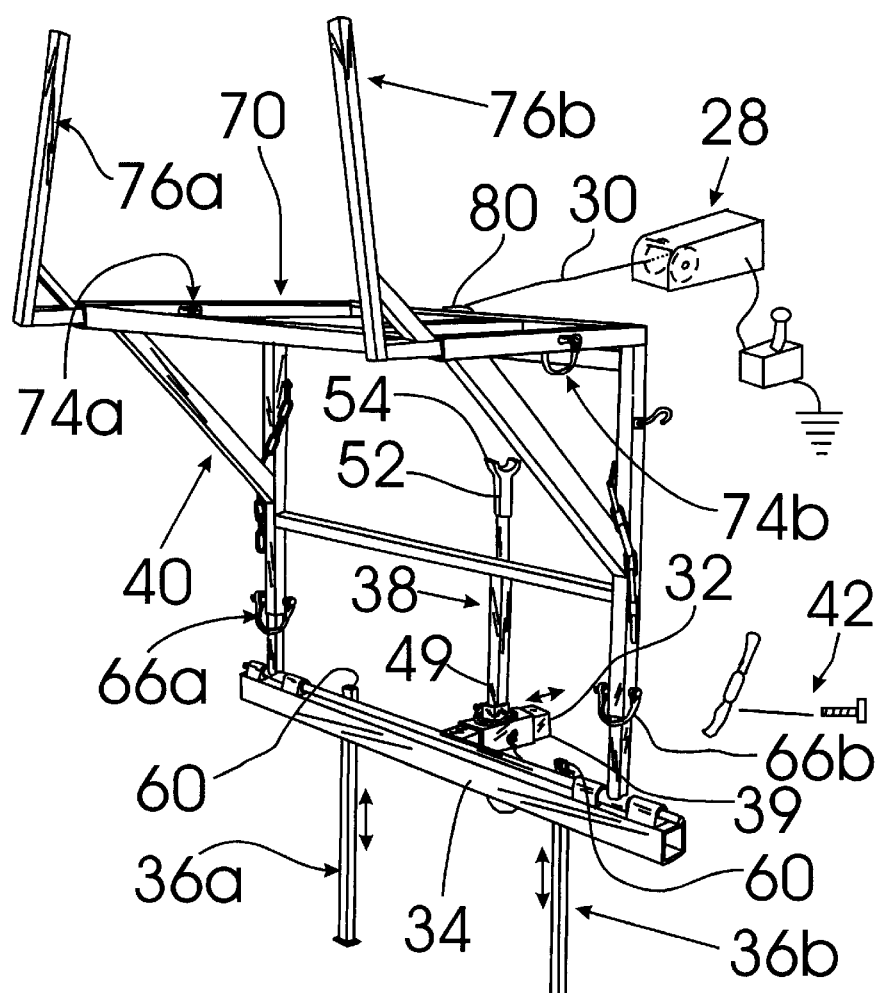
FIG. 2 is a perspective view of the game animal lift assembly for all terrain vehicles of FIG. 1 with the adjustable width game animal support bed oriented parallel to the ground.
Figure 3:
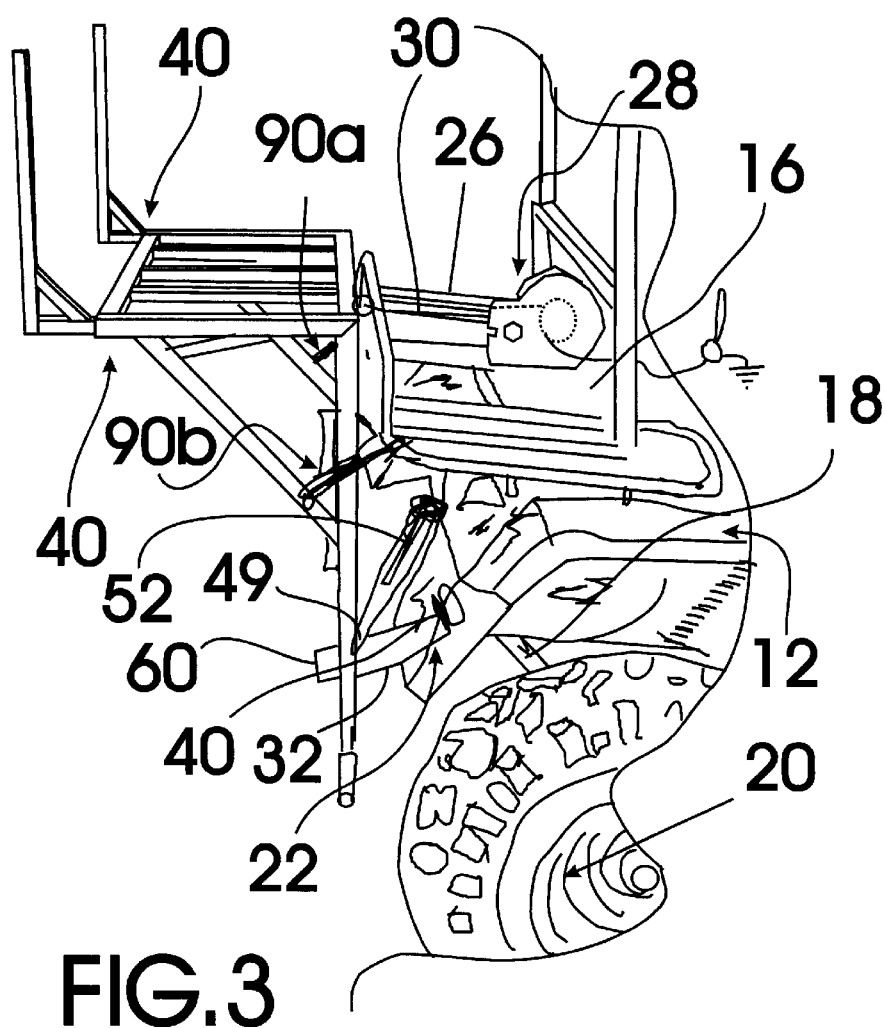
FIG. 3 is perspective view of the game animal lift assembly for all terrain vehicles of FIG. 1 mounted to a representative ATV.

FIGS. 1–3 show various aspects of an exemplary embodiment of the game animal lift assembly for all terrain vehicles of the present invention generally designated 10. Game animal lift assembly for all terrain vehicles (ATV) 10 is adapted for use with ATVs, generally designated 12, that include an ATV chassis, generally designated 16, that have a frame structure 18 carried on a wheeled undercarriage 20, a receiver hitch receiver assembly 22 attached to wheeled undercarriage 20, and a carrying rack 26 supported by the ATV chassis 16.

Game animal lift assembly for all terrain vehicles 10 includes, in this embodiment, an electric winch assembly, generally designated 28; having a flexible winch tether 30; a receiver hitch connecting assembly 32; a lifting mechanism horizontal support rod 34; two height adjustable vertical ground support bar assemblies 36a,36b; an adjustable length chassis support bar assembly 38; and a pivoting game animal lifting mechanism, generally designated 40; pivotally attached to lifting mechanism horizontal support rod 34.

Receiver hitch connecting assembly 32 includes a receiver insert tube 39 adapted to be inserted into and rigidly connected with receiver hitch receiver assembly 22 of ATV 12 with a locking bolt/nut assembly 42.

Adjustable length chassis support bar assembly 38 has a bottom chassis support bar end 49 pivotally supported by the receiver insert tube 39 and an ATV chassis support end 52 having a channel structure 54 connected thereto that is sized to support a section of the ATV frame structure 18 of ATV chassis 16 in a manner to prevent movement of the ATV frame structure 18 toward the wheeled undercarriage 20 when the game animal lift assembly for all terrain vehicles 10 is in use.

Lifting mechanism horizontal support rod 34 is rigidly supported by receiver insert tube 39. Each of the two height adjustable vertical ground support bar assemblies 36a,36b is attached to an end of lifting mechanism horizontal support rod 34 and is telescopically adjustable in height sing locking pins 60 in a manner such that the two height adjustable vertical ground support bar assemblies 36a,36b prevent wheeled undercarriage 20 of ATV 12 from moving toward the ground supporting the ATV 12 when the game animal lift assembly for all terrain vehicles 10 is in use.

Pivoting game animal lifting mechanism 40 includes two lift mechanism height adjustment assemblies 66a,66b and an adjustable width game animal support bed, generally designated 70 includes two width adjustment assemblies 74a, 74b and two game animal lift blades 76a,76b extending perpendicularly from the adjustable width game animal support bed 70. Pivoting game animal lifting mechanism 40 also includes a winch line attachment ring 80 on a center edge of the adjustable width game animal support bed 70 that is connected to a flexible winch tether 30 of winch assembly 28 secured to ATV chassis 16 in a manner such that flexible winch tether 30 provides a tensional force between winch line attachment ring 80 and ATV chassis 16 such that pivoting game animal lifting mechanism 40 is forced to pivot along the lifting mechanism horizontal support rod 34 causing the adjustable width game animal support bed 70 to move from a perpendicular orientation to the ground (shown in FIG. 1) to a parallel orientation with the ground (shown in FIGS. 2 and 3).

Pivoting game animal lifting mechanism 40 also includes two securing chain assemblies 90a,90b that include a length of chain 92 and a hook 94 for securing the pivoting game animal lifting mechanism 40 to ATV chassis 16 while adjustable width game animal support bed 70 is in a parallel orientation with the ground.

It can be seen from the preceding description that a game animal lift assembly for all terrain vehicles has been provided.

It is noted that the embodiment of the game animal lift assembly for all terrain vehicles described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. A game animal lift assembly for all terrain vehicles having an ATV chassis including a frame structure carried on a wheeled undercarriage, a receiver hitch receiver assembly attached to the wheeled undercarriage, and a carrying rack supported by the ATV chassis; the game animal lift assembly for all terrain vehicles comprising:

a winch assembly having a flexible winch tether;

a receiver hitch connecting assembly;

a lifting mechanism horizontal support rod;

two height adjustable vertical ground support bar assemblies;

an adjustable length chassis support bar assembly; and a pivoting game animal lifting mechanism pivotally attached to the lifting mechanism horizontal support rod;

the receiver hitch connecting assembly including a receiver insert tube adapted to rigidly connect with the receiver hitch receiver assembly of the ATV;

the adjustable length chassis support bar assembly having a bottom chassis support bar end pivotally supported by the receiver insert tube and an ATV chassis support end having a channel structure connected thereto that is sized to support a section of the ATV frame structure of the ATV chassis in a manner to prevent movement of the ATV frame structure toward the wheeled undercarriage when the game animal lift assembly for all terrain vehicles is in use;

the lifting mechanism horizontal support rod being rigidly supported by the receiver insert tube;

each of the two height adjustable vertical ground support bar assemblies being attached to an end of the lifting mechanism horizontal support rod and being adjustable in height in a manner such that the two height adjustable vertical ground support bar assemblies prevent the wheeled undercarriage of the ATV from moving toward the ground supporting the ATV when the game animal lift assembly for all terrain vehicles is in use;

the pivoting game animal lifting mechanism including two lift mechanism height adjustment assemblies and an adjustable width game animal support bed including two width adjustment assemblies and two game animal lift blades extending perpendicularly from the adjustable width game animal support bed;

the pivoting game animal lifting mechanism further including a winch line attachment ring on a center edge of adjustable width game animal support bed that is connected to the flexible winch tether of the winch assembly;

the winch assembly being secured to the ATV in a manner such that the flexible winch tether provides a tensional force between the winch line attachment ring and the ATV chassis such that the pivoting game animal lifting mechanism is forced to pivot along the lifting mechanism horizontal support rod causing the adjustable width game animal support bed to move from a substantially perpendicular orientation to the ground to a parallel orientation with the ground;

the pivoting game animal lifting mechanism including two securing chain assemblies for securing the pivoting game animal lifting mechanism to the ATV chassis while the adjustable width game animal support bed is in a parallel orientation with the ground.

* * * * *